(12) United States Patent
Abiakle Kai et al.

(10) Patent No.: US 11,161,475 B2
(45) Date of Patent: Nov. 2, 2021

(54) METHOD FOR STOPPING A VEHICLE

(71) Applicants: Elodie Abiakle Kai, Dubai (AE); Wissam Kai, Dubai (AE)

(72) Inventors: Elodie Abiakle Kai, Dubai (AE); Wissam Kai, Dubai (AE)

( * ) Notice: Subject to any disclaimer, the term of this patent is extended or adjusted under 35 U.S.C. 154(b) by 0 days.

(21) Appl. No.: 16/754,788

(22) PCT Filed: Oct. 9, 2018

(86) PCT No.: PCT/EP2018/077495
§ 371 (c)(1),
(2) Date: Apr. 9, 2020

(87) PCT Pub. No.: WO2019/072858
PCT Pub. Date: Apr. 18, 2019

(65) Prior Publication Data
US 2021/0197762 A1   Jul. 1, 2021

(30) Foreign Application Priority Data

Oct. 10, 2017  (SE) ..................................... 1751255-9

(51) Int. Cl.
| | |
|---|---|
| *B60R 25/08* | (2006.01) |
| *B60R 25/042* | (2013.01) |
| *B60R 25/045* | (2013.01) |
| *B60R 25/32* | (2013.01) |
| *H04W 4/40* | (2018.01) |

(Continued)

(52) U.S. Cl.
CPC .......... *B60R 25/08* (2013.01); *B60R 25/042* (2013.01); *B60R 25/045* (2013.01); *B60R 25/32* (2013.01); *B60R 25/102* (2013.01); *B60R 2025/0405* (2013.01); *B60R 2325/205* (2013.01); *B60T 7/16* (2013.01); *G08G 1/166* (2013.01); *H04W 4/40* (2018.02); *H04W 88/02* (2013.01)

(58) Field of Classification Search
CPC . G08G 1/00; G08G 1/17; G08G 1/166; B60R 25/00; B60R 25/04; B60R 25/0415; B60R 25/08; B60R 25/32
See application file for complete search history.

(56) References Cited

U.S. PATENT DOCUMENTS

| | | | |
|---|---|---|---|
| 6,411,887 B1 | 6/2002 | Martens et al. | |
| 2003/0083807 A1* | 5/2003 | Kuroda | G01C 21/362 |
| | | | 701/468 |

(Continued)

FOREIGN PATENT DOCUMENTS

| | | |
|---|---|---|
| EP | 1480181 A1 | 11/2004 |
| GB | 2308527 A | 6/1997 |

OTHER PUBLICATIONS

International Search Report and Written Opinion from corresponding International Application No. PCT/EP2018/077495, dated Jan. 31, 2019, 9 pages.

*Primary Examiner* — Van T Trieu
(74) *Attorney, Agent, or Firm* — Tucker Ellis LLP

(57) ABSTRACT

The vehicle (1) provides its identity to the portable electronic device (5) of a user not driving the vehicle, the portable electronic device displays visible features of the vehicle, the user selects the vehicle on the display to provide a signal to the wireless communication unit of the emergency stop system of the vehicle. In case of a terrorist attack, signals from a plurality of portable devices cause the vehicle to stop or slow down.

14 Claims, 16 Drawing Sheets

(51) Int. Cl.
  *B60R 25/102* (2013.01)
  *B60R 25/04* (2013.01)
  *B60T 7/16* (2006.01)
  *G08G 1/16* (2006.01)
  *H04W 88/02* (2009.01)

(56) References Cited

U.S. PATENT DOCUMENTS

| | | | |
|---|---|---|---|
| 2005/0104725 A1 | 5/2005 | Leguillier | |
| 2005/0195069 A1 | 9/2005 | Dunand | |
| 2008/0055050 A1 | 3/2008 | Brown | |
| 2011/0301839 A1* | 12/2011 | Pudar | H04W 4/046 |
| | | | 701/408 |
| 2012/0249340 A1* | 10/2012 | Moon | G08G 1/127 |
| | | | 340/901 |
| 2014/0358840 A1 | 12/2014 | Tadic et al. | |
| 2018/0364737 A1* | 12/2018 | Lavoie | B60W 30/06 |
| 2019/0317521 A1* | 10/2019 | Nishi | G08G 1/16 |

* cited by examiner

METHOD FOR STOPPING A VEHICLE

FIELD OF THE INVENTION

This invention relates to methods and systems for stopping a vehicle such as a car, a truck or a bus, in particular in a state of emergency. By using the invention, persons that are not driving the vehicle are able to stop or slow down the vehicle. This may be useful for example if the vehicle is used in a terrorist attack.

BACKGROUND

During the last couple of years, there has been a number of terrorist attacks involving vehicles, so called vehicle-ramming attacks. The vehicle, often a heavy vehicle such as a truck, is driven into crowds of pedestrians, resulting in large number of casualties and wounded. Notable attacks include the attack in Nice Jul. 14, 2016 which resulted in 87 deaths. Attacks have also been carried out in, for example, London, Barcelona, Stockholm, Jerusalem and Berlin. It seems that the number of attacks has increased lately.

Vehicle-ramming requires little skill by the perpetrator and has the potential to cause large numbers of casualties. The vehicles are often stolen or hijacked by the terrorists shortly before the attack. The subsequent attack typically occurs where the streets are crowded with pedestrians.

Protective measures against vehicle ramming includes placing blocking objects, such as bollards, at locations where there is a high density of pedestrians.

Furthermore, modern cars with drive-by-wire systems or autonomous systems could be hijacked from a distance by using remote control. Moreover, such vehicles could possibly have bugs or viruses that causes them to drive dangerously, without any terrorist.

SUMMARY OF THE INVENTION

In a first aspect of the invention there is provided a method to stop or slow down a vehicle in an emergency, said vehicle comprising an emergency stop system, the emergency stop system comprising a first wireless communications unit and a memory, where the emergency stop system is able to cause the vehicle to stop or slow down, and where the emergency stop system has stored in its memory an identity of the vehicle, the method involving a user that is not driving the vehicle, said user carrying a portable electronic device comprising a second wireless communication unit and a display, where data describing visible features is associated to the identity of the vehicle and is stored in at least one of the emergency stop system, a server or the portable electronic device, the method comprising the steps of a) the vehicle providing the identity of the vehicle to the portable electronic device with the use of the first wireless communication unit, b) the portable electronic device receiving the identity of the vehicle with the use of the second wireless communication unit, c) the portable electronic device displaying, on the display, the visible features of the vehicle, d) the user selecting the vehicle on the display of the device, e) the portable electronic device, using the identity of the vehicle, and the second wireless communication unit, providing a signal to the first wireless communication unit of the emergency stop system of the vehicle, and f) the first wireless communication unit of the emergency stop system receiving the signal and the emergency stop system causing the vehicle to stop or slow down.

This enables persons that are not driving a vehicle, for example pedestrians, to stop a vehicle, thereby providing a crowd sourcing solution for prevention of vehicle ramming attacks.

It may be useful if the visible features of the vehicle are only displayed on the display of the electronic device if the electronic device is within a threshold distance from the vehicle. This can be achieved if the identity is provided from a server to the portable electronic device only if the distance between the position of the vehicle and the position of the portable electronic device is below a threshold distance. This makes the device display fewer vehicles and may decrease network traffic. Moreover, the visual features may be displayed on the display of the portable electronic device only if the vehicle behaves in a certain predetermined manner. The identity may be transmitted from the vehicle only if the vehicle behaves in a certain predetermined manner. The predetermined manner may be the vehicle moving with a speed above a thresholds speed or accelerates with an acceleration above a threshold acceleration.

The visible features may, for example, be selected from vehicle colour, vehicle manufacturer, vehicle license plate number or license plate letters, or part of license plate numbers or letters, vehicle model, type of vehicle, and nationality, symbol or flag on license plate of the vehicle.

The emergency stop system of the vehicle may have receive signals from a plurality of different electronic devices within a predetermined time window in order to cause the vehicle to stop or slow down. This prevents triggering of stop by mistake or mischief.

Communication between the emergency stop system and the portable electronic device may be arranged in different ways. The identity may be provided from the vehicle to a server, and the server provides the identity to the portable electronic device.

The data describing the visible features may be transmitted from the vehicle together with the identity. The data describing the visible features may be retrieved by from a database on the electronic device, by using the identity of the vehicle. The data describing the visible features may be provided to the electronic device from a database on a server, using the identity of the vehicle.

In a second aspect of the invention there is provided a vehicle control system comprising a vehicle, said vehicle comprising an emergency stop system, the emergency stop system comprising a wireless communication unit, where the emergency stop system is able to cause the vehicle to stop or slow down, said emergency stop system being configured to wirelessly provide an identity of the vehicle, said identity being linked to data describing visible features of the vehicle, the vehicle control system further comprising an portable electronic device, said electronic device comprising a wireless communication unit and a display, said electronic device being configured to receive the identity of the vehicle and display the visible features of the vehicle, the electronic device further being configured to, when a user selects the vehicle on the display, sending a signal to the emergency stop system of the vehicle, said signal causing the vehicle to stop or slow down. The visible features of the vehicle may be displayed on the display of the portable electronic device only if the distance between the vehicle and the portable electronic device is below a threshold distance.

I a third aspect of the invention there is provided a computer software product arranged to be executed on or from a portable electronic device with a display, and a wireless communication unit, the computer software product being arranged to a) receive the identity of a vehicle, b) using the identity to retrieve data describing visible features of the vehicle, c) displaying, on the display of the portable electronic device, the visible features of the vehicle, d) receiving input from a user selecting the vehicle, and e) the electronic device, using the identity of the vehicle, providing a wireless stop signal to the vehicle.

In a fourth aspect of the invention there is provided an emergency stop system for a vehicle that is controlled by a driver, the emergency stop system being able to cause the vehicle to stop or slow down, said emergency stop system comprising a wireless communication unit where the emergency stop system has stored in its memory an identity of the vehicle, the emergency stop system being configured to wirelessly provide the identity of the vehicle, the emergency stop system further being configured to immediately stop or slow down the vehicle when it receives a wireless stop signal. The emergency stop system of claim may provide the identity repeatedly In a fifth aspect of the invention there is provided a vehicle comprising an emergency stop system.

DRAWINGS

The accompanying drawings form a part of the specification and schematically illustrate preferred embodiments of the invention, and serve to illustrate the principles of the invention.

Figure 11:
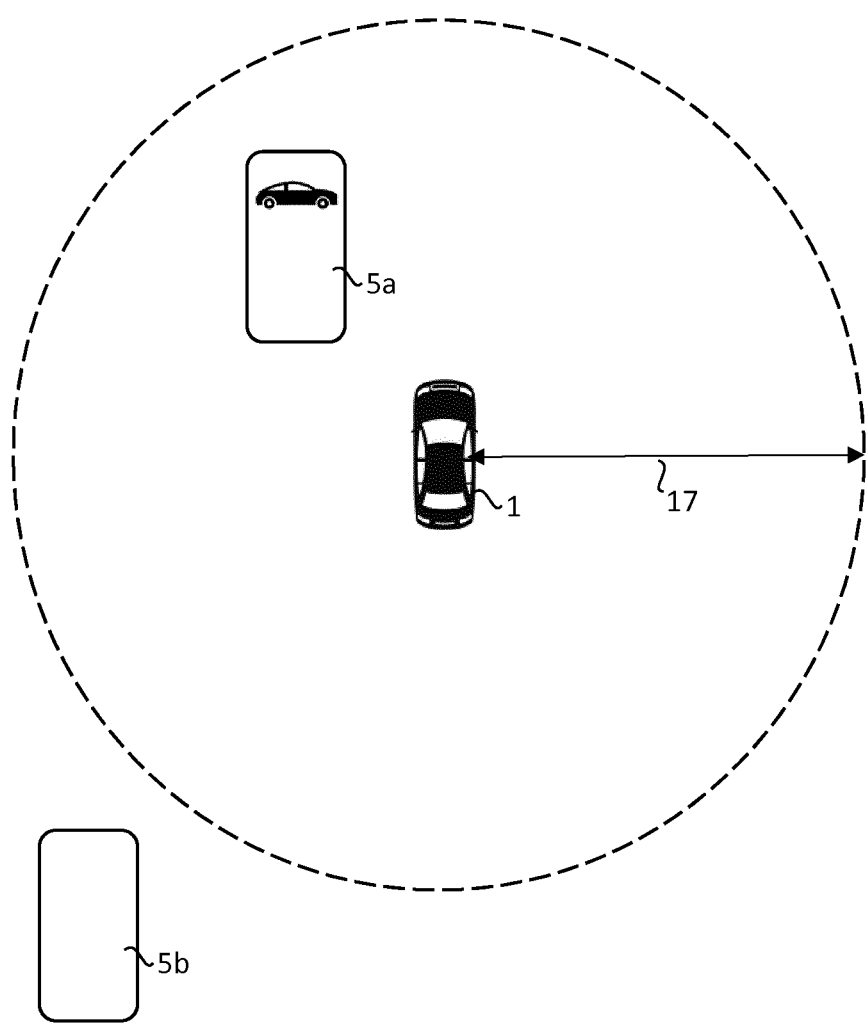
Figure 12:
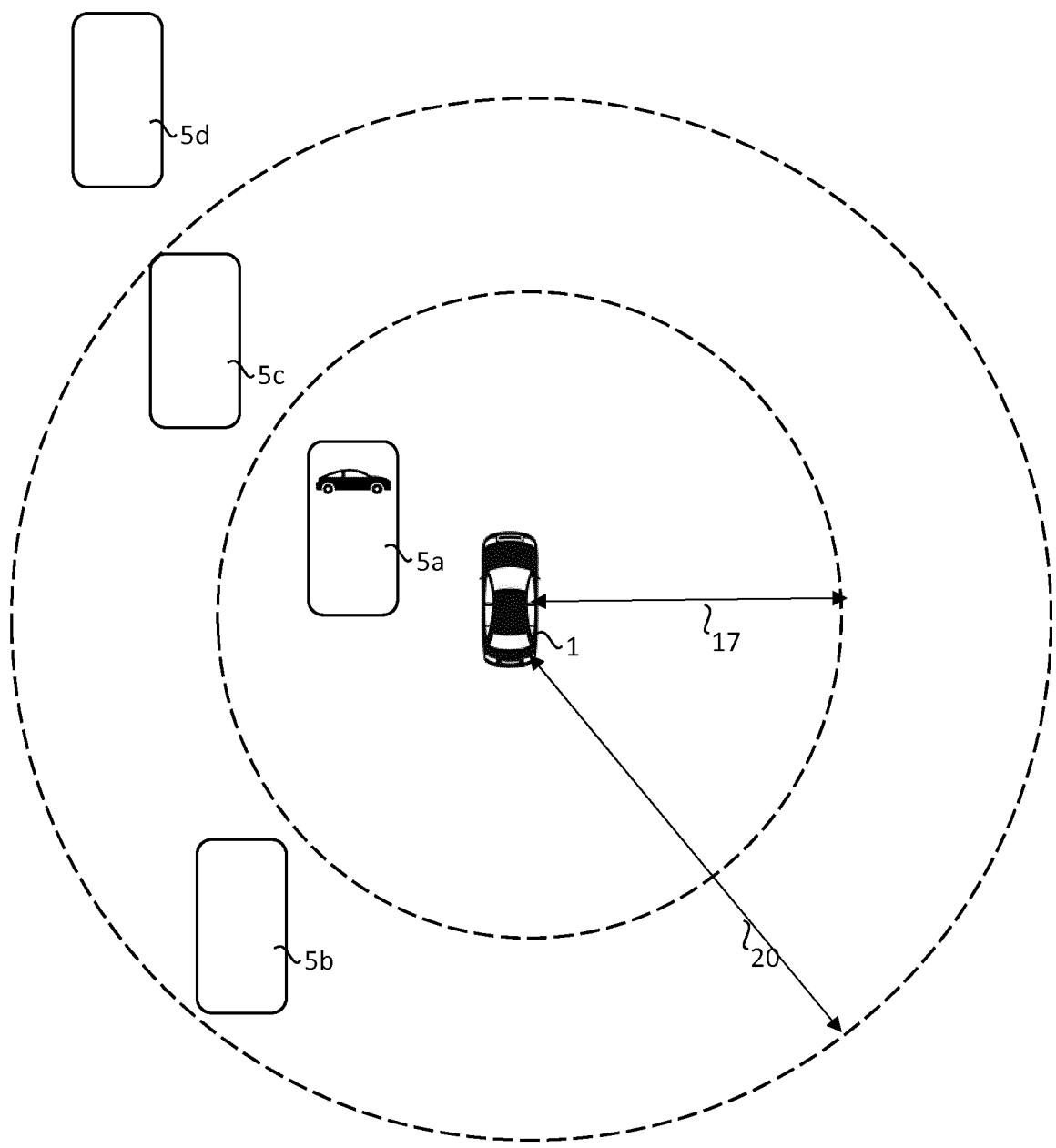

FIGS. 11-12 schematically shows threshold distances.

Figure 13:
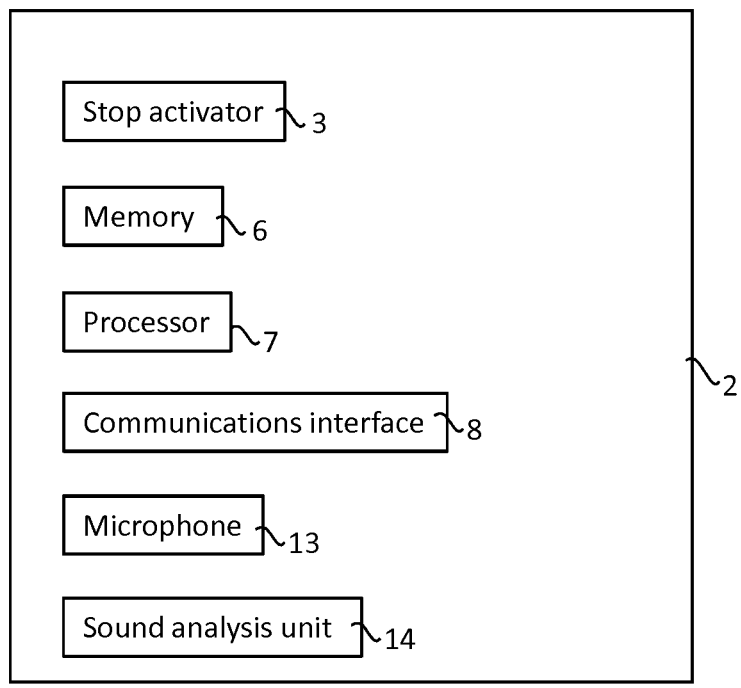
Figure 16:
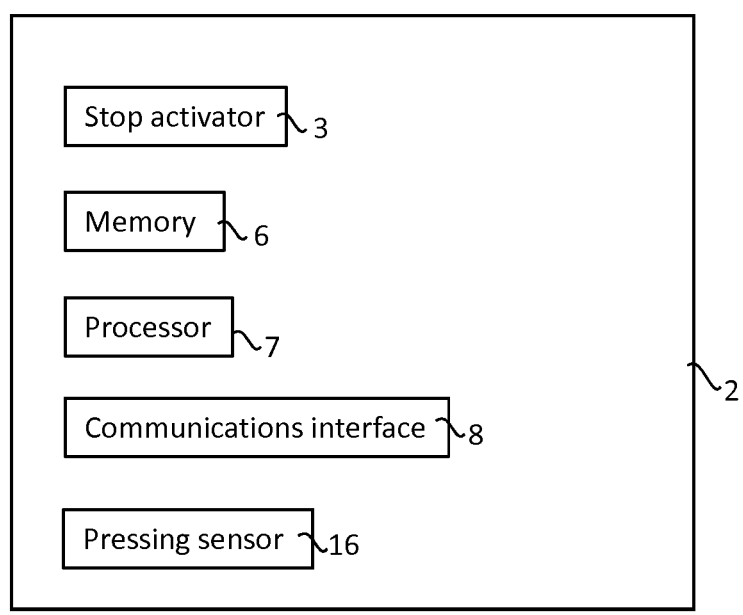
Figure 17:
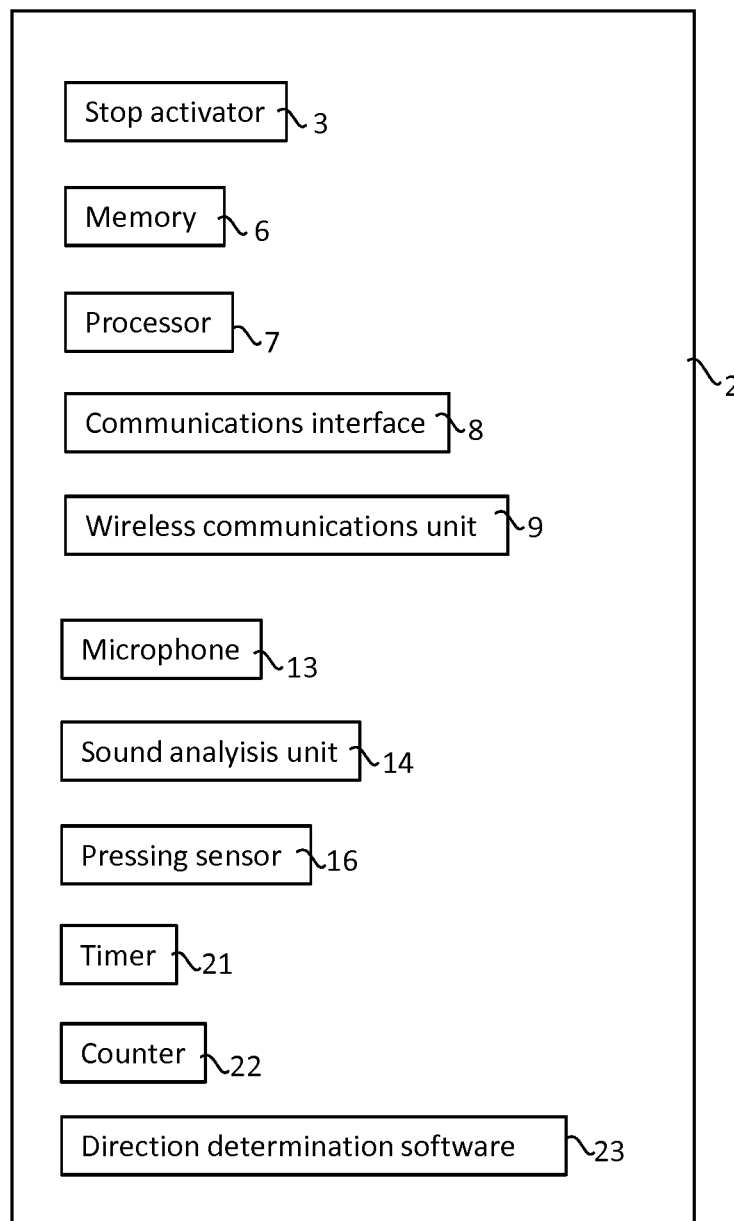

FIGS. 13, 16 and 17 schematically shows emergency stopping systems.

Figure 14:
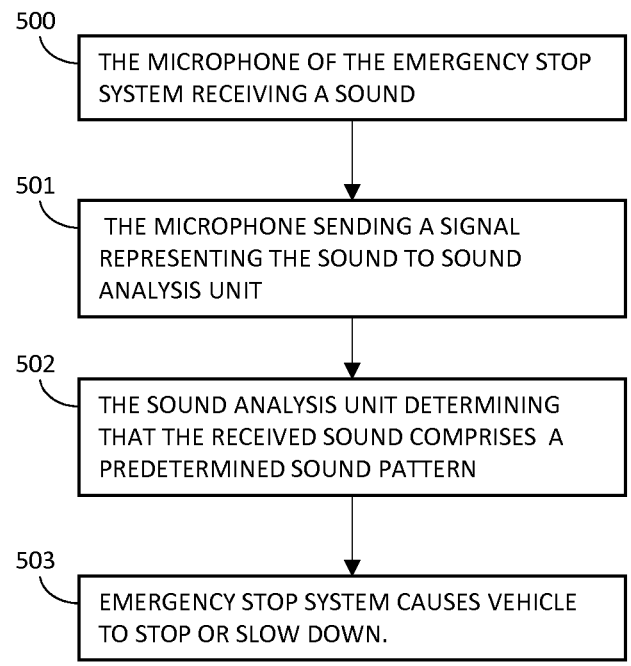
Figure 18:
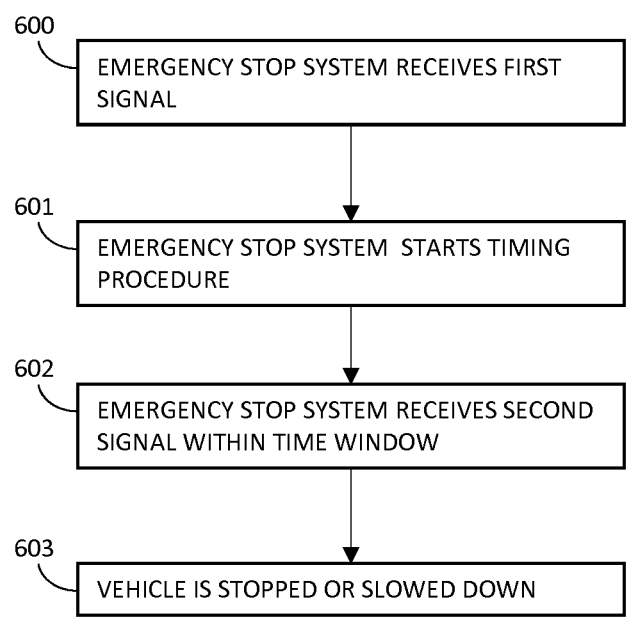

FIGS. 14 and 18 are flowcharts showing methods.

Figure 15:
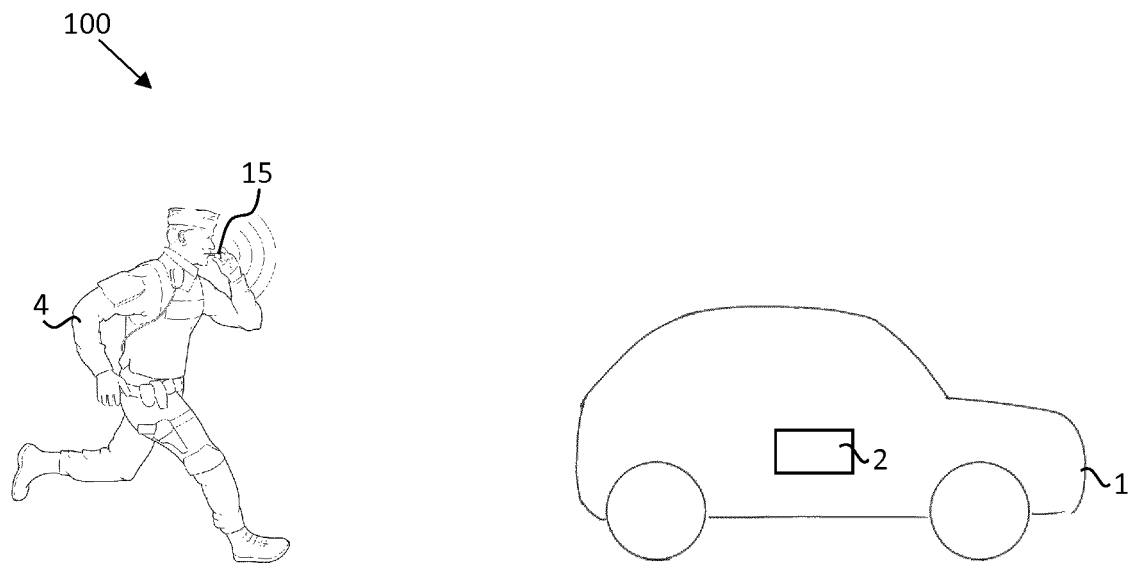

FIG. 15 schematically shows a system comprising a vehicle, a user and a portable device for making a sound.

Figure 19:
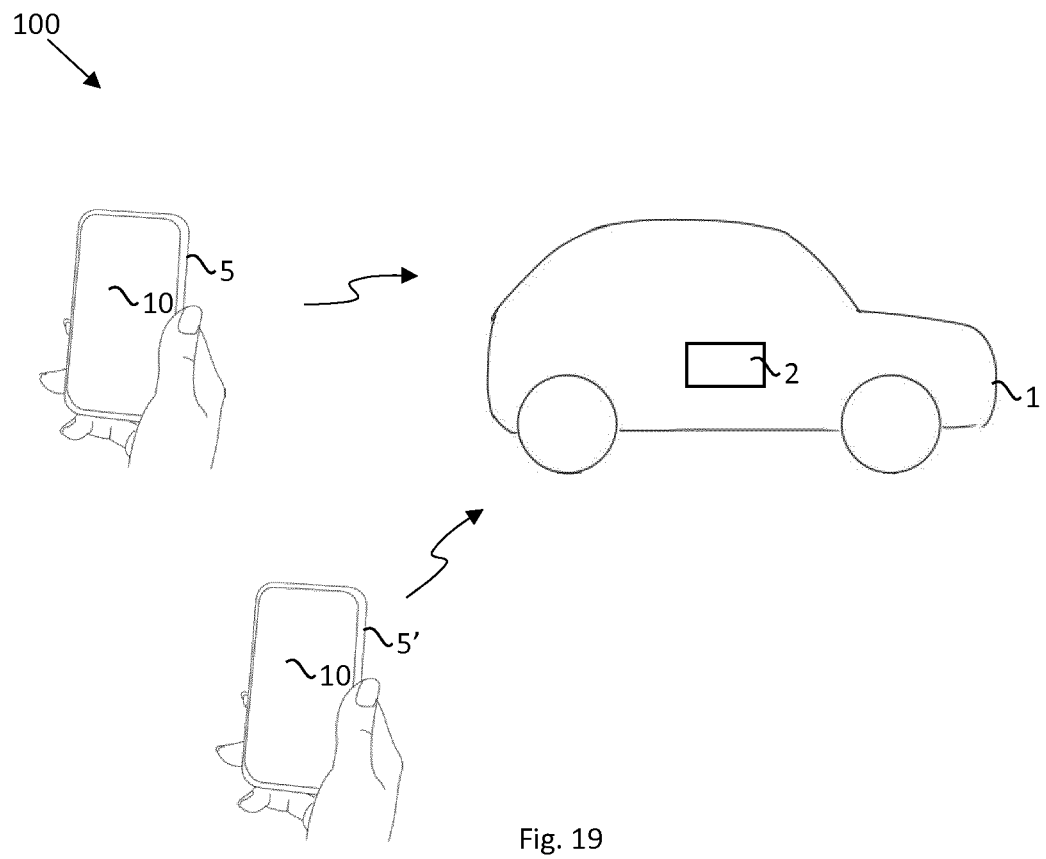

FIG. 19 schematically show a vehicle control system.

Figure 20:
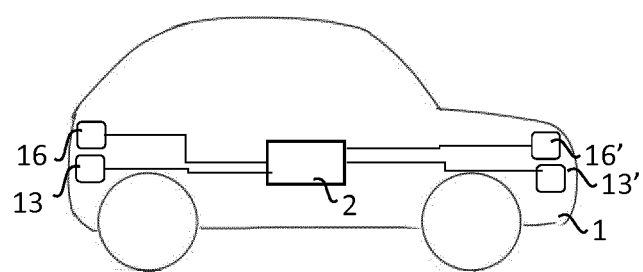

FIG. 20 schematically show a vehicle with an emergency stopping system.

Figure 21:
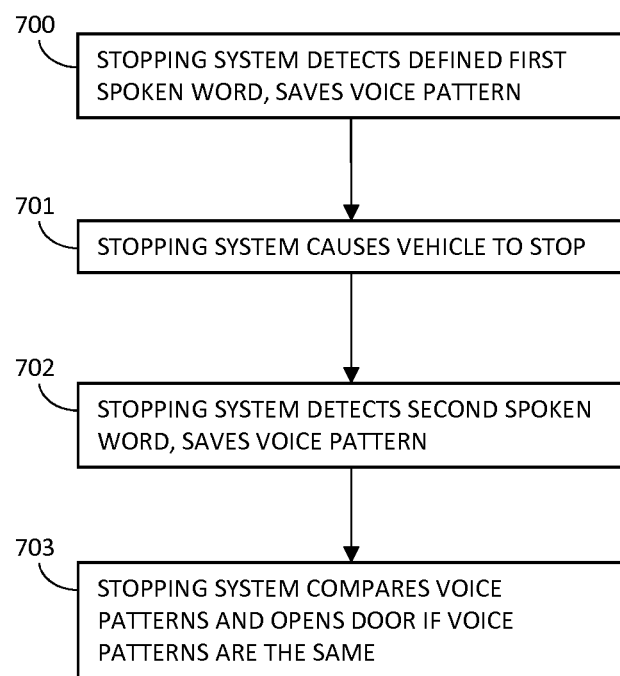
Figure 22:
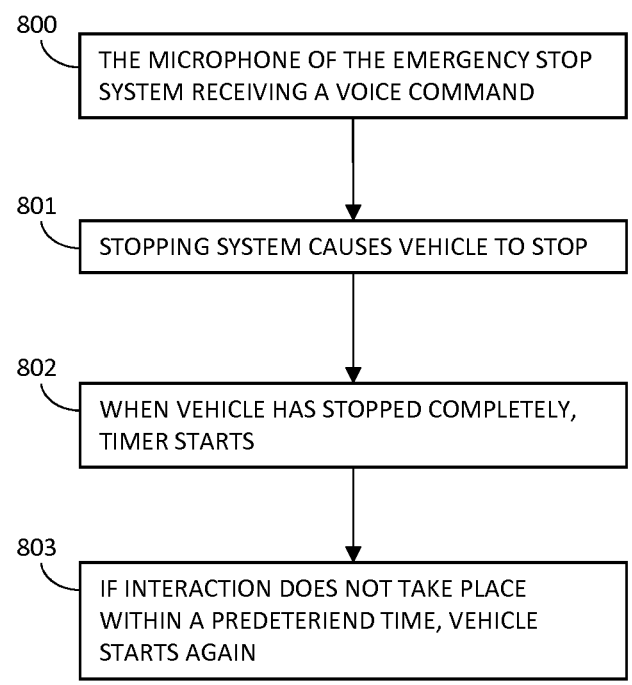

FIGS. 21-22 are flowcharts showing methods in non-emergency embodiments

DETAILED DESCRIPTION

Vehicle 1 may be any type of powered vehicle such as a car, truck, pick-up, bus or tractor. The vehicle 1 may preferably be a vehicle that is capable of driving at a speed of more than 20 km/h, even more preferably more than 30 km/hour and most preferably 40 km/h and most preferably faster than 50 km/hour. The vehicle 1 is preferably adapted to drive on a road using wheels. Any type of propulsion may be used by the vehicle 1. The vehicle 1 can be powered by for example a combustion engine, such as a gasoline or a diesel engine, or an electric motor. The electric engine may be powered by, for example a battery a solar cell or a fuel cell.

The vehicle 1 has various vehicle subsystems. Such vehicle subsystems may be, for example, the braking system, the ignition system, the fuel injection system, battery or electric power supply. Other example of such vehicle subsystems includes Advanced driver-assistance system (ADAS) that is able to control speed, brake and steering. The vehicle may also be a completely automatous car (self-driving car) vehicle and thus have a vehicle subsystem that has autonomous control over the vehicle (autonomous control subsystem).

The vehicle is preferably a vehicle that is controlled by a driver, typically with a steering wheel and one or more devices to control speed such as a gas (or speed pedal), possibly assisted by an ADAS. Thus vehicle 1 is preferably a non-autonomous vehicle, in certain embodiments.

Figure 1:
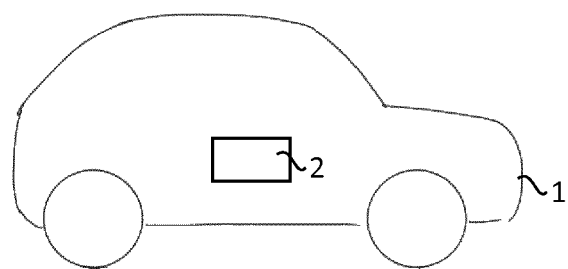
FIG. 1 is a schematic drawing of a vehicle.

The vehicle 1 is equipped with an emergency stop system 2, as seen in FIG. 1. The emergency stop system is referred to as "stopping system 2" in certain non-emergency embodiments described below. The general purpose of the emergency stop system 2 is to enable persons that are not driving the vehicle 1 to stop or slow down the vehicle 1. The person not driving the vehicle 1, who may be a pedestrian, a biker, a passenger in a car nearby, a passenger in the vehicle 1, for example a bus passenger, is referred to as "user 4" hereafter. User 4 is preferably a person that can control vehicle 1 solely with the methods described herein, thus user 4 does not have any other means to stop or control the vehicle, such as a key, fob or remote control other than as described herein.

The emergency stop system 2 has a stop activator 3 that is connected to at least one vehicle subsystem of the vehicle, for example one or more braking systems, speed control systems, gas pedal, fuel injection, ignition, battery, electric power supply, or be interfaced with, or be a part of, an ADAS or an autonomous car system. The stop activator 3 may be software that interacts or is a part of other software of the vehicle 1, and may have electronic or mechanical parts that interact with other vehicle subsystems of the vehicle 1.

The stop activator 3 is controlled by the emergency stop system 2. The emergency stop system 2 can receive input from various sources, for example portable electronic device 5, pressing sensor 16, microphone 13, and then activate the stop activator 3, causing the vehicle 1 to stop or slow down.

The stop activator 3 typically overrides the controls of the driver, for example by stopping fuel injection, activating a brake or stop electric power to the motor in the case of an electric car. The stop activator 3 may provide instructions to software subsystems of vehicle 1 that causes the vehicle 1 to stop or slow down.

The stop activator 3 may be designed to stop or slow down the vehicle 1 in a controlled manner. For example, to slow down the vehicle to a predetermined maximum speed, for example at most 20 km/h, more preferably at most 10 km/h and most preferably at most 5 km/h. The slowing down may be done in a controlled manner, such as a slow deceleration or in a very fast deceleration.

The stop activator 3 may cause the vehicle 1 to come to a complete stop within a short time, for example 30 seconds, more preferably 20 seconds, more preferably 10 seconds, more preferably 5 seconds and most preferably 3 seconds and most preferably 1 second. It is desirable to make the vehicle 1 stop as soon as possible. However, the deceleration may need to be controlled in some manner, since there is a small risk that stop actuator 3 is activated by mistake or by mischief, and then is important that the drivers and passengers are not harmed. In addition, there may be innocent passengers in the vehicle 1.

Preferably the vehicle 1 stops responding to driver actions (steering, accelerator) when the stop activator 3 is activated.

Activation of the stop activator 3 may cause the vehicle 1 to be undrivable for a predetermined time, for example, at least 15 seconds or at least 30 seconds and at most 1 minute, at most 5 minutes, at most 10 minutes or at most 30 minutes. This makes it possible for pedestrians to move to a safe area, for police to take control of the situation and possible arrest the terrorists. However, the time should be short enough to not be too inconvenient in the case of activation by mistake or mischief.

In addition to stopping or slowing down, the emergency stop system 2 may switch on the horn, or to activate hazard lights, of the vehicle 1 in order to alert bystanders.

Figure 2:
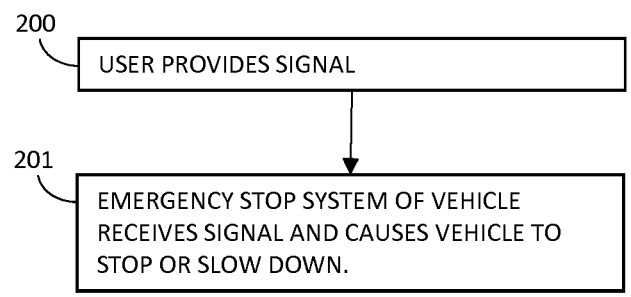
FIG. 2 is a flowchart showing a method.
Figure 3:
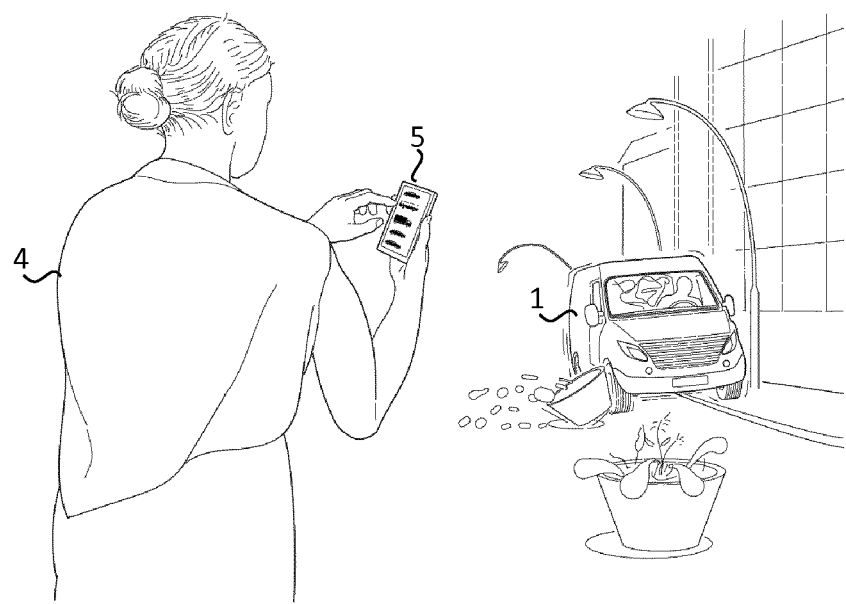
FIG. 3 shows a user, a dangerous vehicle and a portable electronic device.

The emergency stop system 2 is able to receive input from users 4 in the vicinity of the vehicle 1, in various manners, for example touch, sound or signals from a portable electronic device 5, or a combination of these kinds of signals. With reference to FIG. 2, in step 200 a user 4 provides the signal to the emergency stop system 2 of the vehicle 1. In step 201, emergency stop system 2 receives the signal from the user 4 and the stopping activator 3 of the emergency stop system 2 causes the vehicle 1 to stop or slow down.

With reference to FIGS. 4, 13, 16 and 17, the emergency stop system 2 may comprise memory 6 for storing software, and in some embodiments an identity of the vehicle 1, processor 7, communications interface 8, wireless communications unit 9 comprising a transmitter and a receiver, microphone 13, sound analysis unit 14, and pressing sensors 16, danger determination system 18, timer 21, counter 22 and direction determination software 23. The communication interface 8 provide connections between components of the emergency stop system 2, and between the emergency stop system 2 and subsystems of the vehicle 2.

The system and methods can also be used for stopping a vehicle in the case of theft of the vehicle or for example when a vehicle is hunted by the police.

FIGS. 3 to 12 shows an embodiment where a user 4 uses a portable electronic device 5 to stop or slow down the vehicle 1. The portable electronic device 5 (FIG. 5) is typically a mobile phone 5, such as an iPhone or an Android phone, but may also be a smart watch or smart glasses (for example Google glasses). The portable electronic device 5 has a display 10, which preferably is a colour display. The display 10 may be able to show letters, digits, symbols or images. Preferably display 10 is a touch display, enabling the user to select items on the display. However, there may be other means for navigating and selecting items on the display, such as a joystick, or voice command. The portable electronic device 5 has a processor 25 and a memory 26 and at least one wireless communication unit 24 comprising a transmitter and a receiver. Many different types of wireless communication methods and protocols are mentioned herein. In one embodiment the wireless communication unit 24 of device 5 enables device 5 to communicate wirelessly directly with wireless communication unit 9 of emergency stop system 2. The wireless communication unit 24 may be unit for enabling wireless communication between device 5 and emergency stop system 2 in a network. The electronic device 5 may have wireless communication unit 24 that enables both communication directly between emergency stop system 2 and device 5, and communication via network 19.

The emergency stop system 2 and the portable electronic device 5 is a part of vehicle control system 100 (FIGS. 6-7), which may comprise a plurality of vehicles 1 and devices 5. The emergency stop system 2 of the vehicle 1 has stored in its memory 6 an identity (ID) of the vehicle. The identity is preferably a unique identity. The identity may be, for example, a number being stored in memory 6. The identity may for example be the license plate number/letters of the vehicle, if necessary in combination with a country code, but may also be any other useful combination of digits and/or letters. The ID may also be an IMSI of a cell phone unit for the emergency stop system 2 or the vehicle 1 in general. The ID may also be a vehicle serial number.

The vehicle control system 100 has stored data describing visible features of the vehicle 1. Preferably the vehicle control system 100 has stored data describing visible features for a plurality of vehicles 1. The visible features of each vehicle 1 is linked, in vehicle control system 100, to the unique ID of the vehicle 1, such that the data describing the visible features can be retrieved using the ID.

The visible features are preferably easily recognizable features that are visible from some distance, for example type of vehicle (bus, car, truck, pickup, sedan) manufacturer (Ford, Volvo, Mercedes Benz) colour (black, red, blue etc.) model (Ford Escort, Toyota Land Cruiser), nationality, or part or entire license plate number. The license plate may also include one or more letters and those may also be used as visible features. For example, in certain countries (for example Germany) the first letter or letters indicate the city or region of registration of the vehicle, and those are typically easy to identify and memorize. In the USA the state of registration may be used. Furthermore, the license plate may display flags or symbol of the nation (Norway) or region (Switzerland) of registration, and those are typically easy to identify. Other visible features that may be used include company names or logos displayed on the body of the vehicle.

Preferably a combination of features is used that allows a user 4 to identify the vehicle 1 with some certainty from a distance. The combination of colour, body type and vehicle manufacturer should make it possible to identify the vehicle 1 with some certainty among the visible features of vehicles on a two-way street within a radius of 30 meters. Preferably the visible features are chosen so that a single vehicle can be identified with some certainty in a group of vehicles, preferably a random group of 3 vehicles, more preferably a group of 10 vehicles and more preferably a group of 100 vehicles, and most preferably more than 100 vehicles. If a part of information (letter or number) from the license plate is included as a visible feature, the accuracy in the identification should increase by at least one magnitude. The entire license plate together with nationality should make it possible to identify the vehicle 1 uniquely among all the vehicles in the world. However, there is a risk the user 4 does not have time to identify the complete license plate.

In certain embodiments, the data describing the visible features of the vehicles may be used as the unique ID of the vehicle, in particular when a part of the license plate is included in the visible features.

Briefly, the emergency stop system 2 provides the identity of the vehicle 1 to the portable electronic device 5 carried by user 4. The portable electronic device 5 receives the identity of the vehicle 1 and displays the visible features of the vehicle 1 on the display 10. This enables the user 4, who has observed a vehicle 1 that behaves in a dangerous way, to select the vehicle 1 on the display 10 with the corresponding visible features. This causes the portable electronic device 5 to provide a signal to the emergency stop system 2. The signal is received by the wireless communication unit 9 of the emergency stop system 2. The stopping activator 3 of the emergency stop system 1 is then activated, causing the vehicle 1 to stop or slow down.

The vehicle control system 100 comprises stored data about the visible features of the vehicle 1. The visible features data may be stored anywhere in vehicle control system 100. The visible features data may for example be stored in the emergency stop system 2 of the vehicle and provided to the device 5 together with the ID of the vehicle 1. Alternatively, the visible features data may be stored on the device 5 as a database, and the devise 5 uses the ID of the vehicle to query the database for visible feature data. The visible feature data may also be stored on a server 11 and provided to the portable electronic device 5 from the server 11 (see below). The server 11 may use the ID to query the database for visible features data, and provide the data to the portable electronic device 5.

Figure 8:
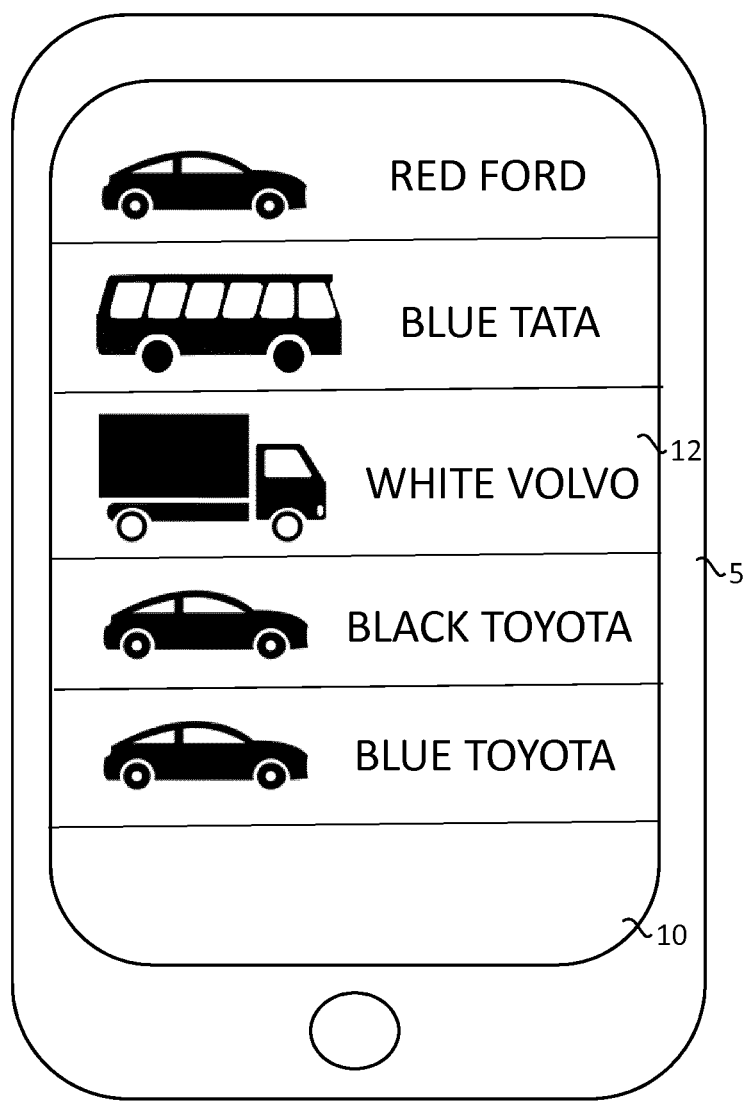
FIG. 8 is a schematic drawing of a portable electronic device.

The portable electronic device 5 may have software installed (e.g. an app) that carries out parts of the method described herein. The software may be downloaded in advance to the portable electronic device. The software preferably is capable of displaying visible features of a plurality of vehicles, for example as a list 12 (FIG. 8) of vehicles 1, and the user 4 is thereby able to select the desired vehicle 1 by for example by touching the screen 10 where the visible features vehicle 1 is displayed. In one embodiment a photo of the vehicle 1 may be included in the visible features data and displayed to the user. However, it may be more efficient, to show icons such as one symbol for a car, one symbol for bus, etc (FIG. 8). The symbol may be coloured to the colour of the vehicle, or shown with other visible features of the vehicle 1. Alternatively, the software may be run on server 11, which causes the device 5 to display visible features on the display 10.

Communication between emergency stop system 2 and portable electronic device 5 may be arranged in numerous different ways. Useful technologies and protocols include NFC, RFID, Bluetooth, ZigBee, Wi-Fi, lora, sigfox, fixed wireless network, mobile wireless network, satellite network, 2G, GSM, TDMA, FDMA, GPRS, EGPRS, EDGE, 3G, HSPA, WCDMA, CDMA2000, CDMA, 4G, OFDM, LTE-M, NB-IoT, OFDMA, SC-FDMA, 5G, or WiMAX.

Figure 4:
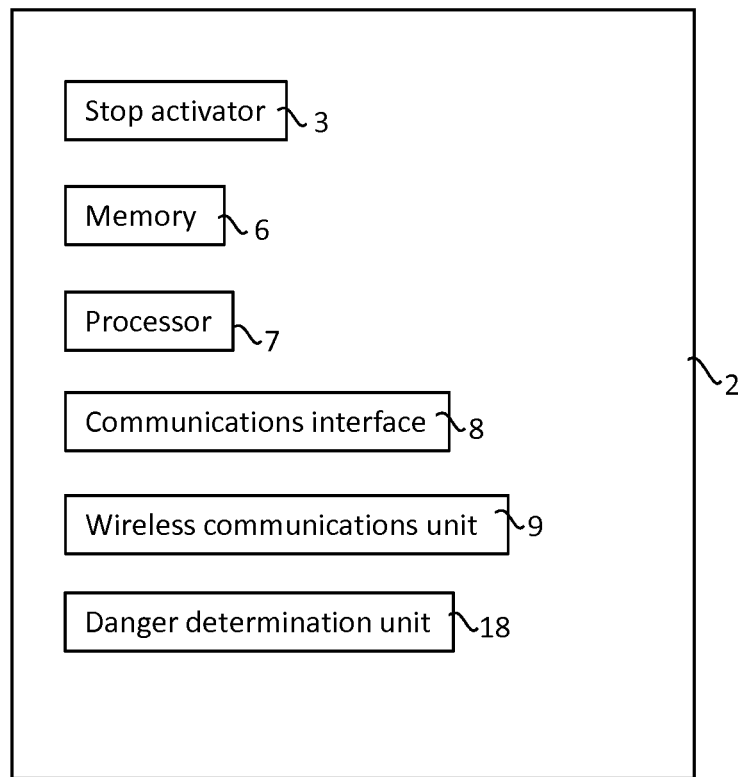
FIG. 4 is a schematic drawing of an emergency stop system

As seen in FIG. 4 wireless communication can be carried out directly between device 5 and emergency stop system 2, by two-way radio. Thus, communication can be carried out in a peer to peer manner.

Figure 5:
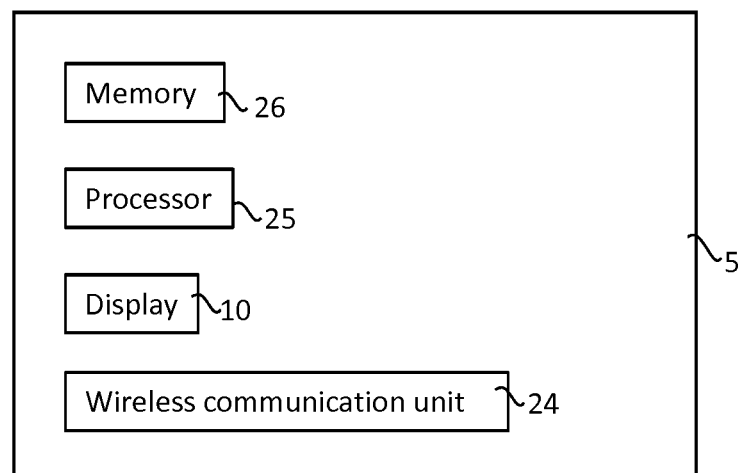
FIG. 5 is a schematic drawing of a portable electronic device.

Alternatively, as seen in FIG. 5 communication can be carried out via network 19, for example a cell network. This may involve server 11.

Preferably parts, or even more preferably all, of the communication between emergency stop system 2 and device 5 is wireless. However, when communication is carried out through a network as in FIG. 5 parts of the communication may be transmitted by wire.

Again, communication in system 100 can be arranged in numerous ways a few possibilities will now be mentioned as examples.

Figure 6:
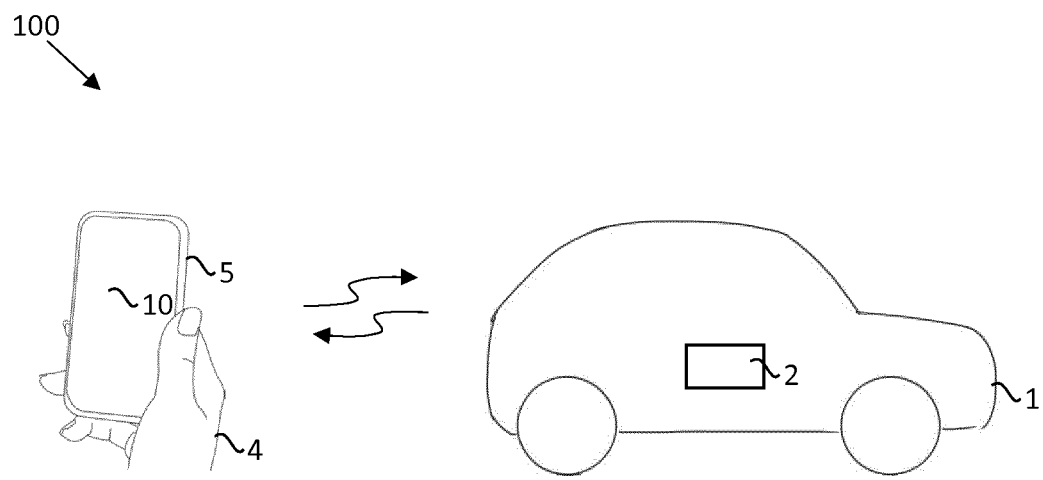
FIGS. 6-7 are schematic drawings of vehicle control systems.

As a first possibility, the ID is transmitted as a radio signal directly from emergency stop system 2 to the device 5, as seen in FIG. 6, and the device 5 transmits the stop signal directly to the emergency stop system 2. Broadcast of ID is preferably done repeatedly with a predetermined time interval, which preferably is less than 60 seconds, more preferably less than 10 seconds, more preferably less than 1 second. Broadcast may be conditioned such that it is only carried out when certain criteria are fulfilled (see below). In one embodiment the portable electronic device 5 comprises an RFID reader that causes an RFID tag in the emergency stop system to broadcasts its ID.

Broadcast may be omnidirectional or directional, i.e. carried out in a certain direction.

Figure 7:
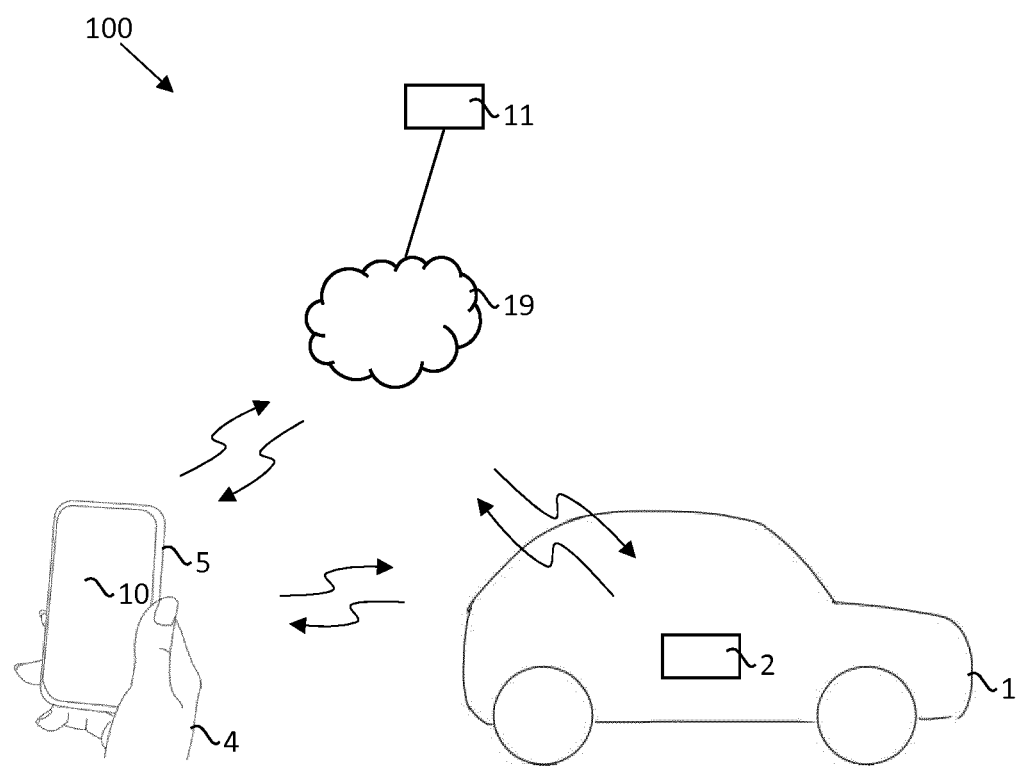

A second possibility is that the emergency stop system 2 provides the ID to a server 11, that in turn provides the ID to the portable medical device 5 (FIG. 7). The ID can for example be provided to the device 5 with the use of push technology. Thus, the identity may be provided from the vehicle 1 to the server 11, and from the server 11 to the portable electronic device 5. In this embodiment it useful if some kind of geographic filter is applied, so that the ID is distributed to devices 5 that are within a threshold distance 17 from the vehicle 1 (see below).

A third possibility is that the emergency stop system 2 provides the ID to a stationary or mobile retransmitter that relays the ID to devices 5 in the vicinity. This may be used to implement a geographic filter.

A fourth possibility is that some signals, for example the ID signal is provided through network 19, and the stop signal is provided directly from the device 5 to the emergency stop system 2, or vice versa. For example, it may, in some cases, be advantageous to send the stopping signal directly from the device 5 to the emergency stopping system 2, rather than via server 11, in order to be fast and reliable. It may also be desirable to send the stopping signal from portable device 5 both directly to vehicle 1 and to server 11, which passes it onto vehicle 1 in order to provide redundancy. Furthermore, the emergency stop system 2 may provide the identity directly to the portable electronic device 5, and the portable electronic device 5 may use the identity of the vehicle to obtain data describing the visible features of the vehicle 1 from server 11, for example by querying server 11.

Again, many other possibilities for arranging communication between emergency stop system 2 and device 5 are possible.

Figure 9:
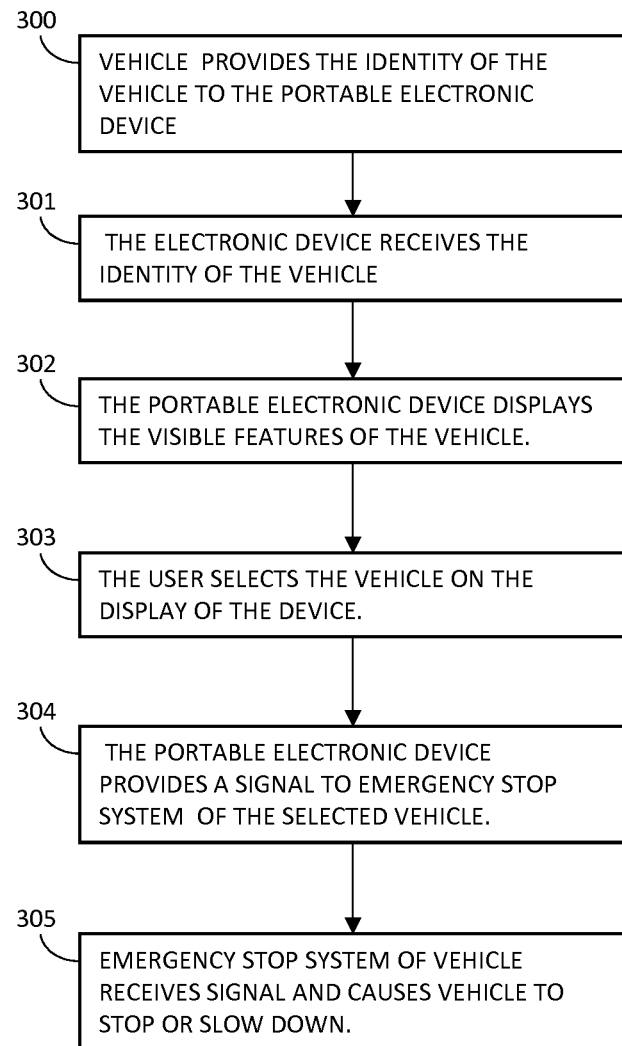
FIG. 9-10 are flowcharts showing methods.
Figure 10:
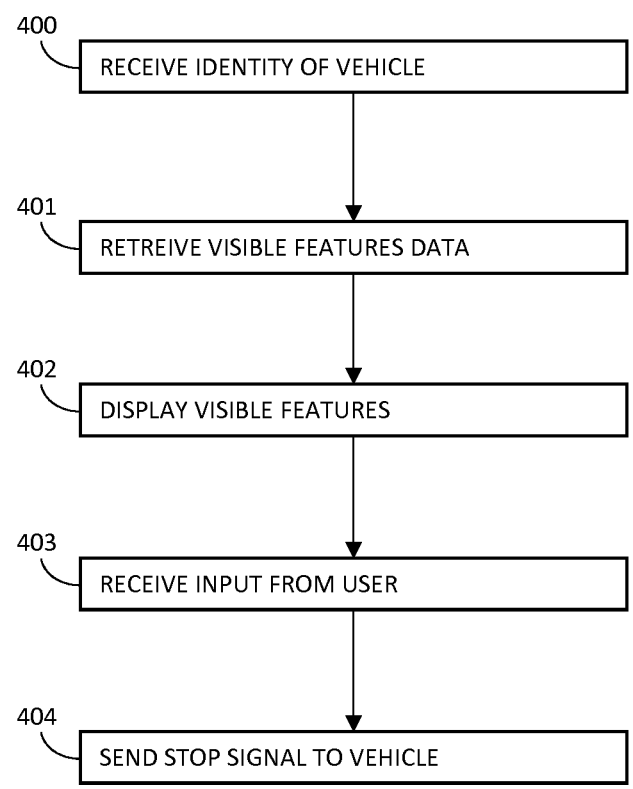

With reference to FIG. 9 in step 300 the vehicle 1 provides the identity of the vehicle to the portable electronic device 5 with the use of the wireless communication unit 9. The ID is preferably provided to the device 5 repeatedly, preferably with a predetermined time interval, which preferably is less than 60 seconds, more preferably less than 10 seconds, more preferably less than 1 second. Transmission may be conditioned by certain rules. For example, transmission may occur only when the vehicle 1 is switched on, for example when the engine is running. Alternatively, provision of the ID is only carried out when the vehicle behaves in a certain way. For example, the identity may be broadcast only when the vehicle 1 is moving or may be done only when the vehicle 1 is moving with a speed over a predetermined threshold speed, for example 15 km/h, or when the vehicle 1 accelerates faster than a predetermined acceleration, or behaves in a dangerous manner (see below). Information about speed and acceleration may be provided to emergency stop system 2 from the subsystems of the vehicle 1. Danger determination unit 18, may be used to switch on broadcast, see below.

The visible features are preferably provided to a plurality of portable devices 5. This provides crowd-souring of vigilance against attacks. A threshold distance 17 may be used to provide a geographic filter, se below.

In step 301 the electronic device 5 receives the ID of the vehicle with the use of the wireless communication unit 24. In step 302 the portable electronic device 5 displays, on the display 10, the visible features of the vehicle 1.

In step 303 the user 4, who wants to stop vehicle 1 because it behaves in a dangerous way, selects the vehicle 1 on the display 10 of the device. Selection by user 4 can be done with the aid of a touch display but also by using for example a navigation button or joystick for example by the side of the display 10. In step 304 the portable electronic device 5, using the identity of the vehicle 1, provides a signal to the wireless communication unit 9 of the emergency stop system 2 of the selected vehicle 1. When the user 4 selects the vehicle on the display 10, a signal is immediately broadcast to the vehicle 1 in question. The correct vehicle 1 is selected by means of the ID. Only the vehicle with the corresponding ID is stopped or slowed down. Other vehicles are not affected. For example, the wireless communication unit 24 of the portable electronic device transmits a signal that is received by a plurality of vehicles 1 but only the vehicle 1 with the corresponding ID reacts to the signal. In step 305 the wireless communication unit 9 of the emergency stop system 2 receiving the signal and emergency stop system 2 causing the vehicle to stop or slow down by using stop activator 3.

Vehicle control system 100 can preferably handle a plurality of vehicles 1 with emergency stop systems 2. Thus, visible features of a plurality of vehicles 1 may be displayed on display 10 and list 12.

The portable electronic device 5 preferably has software stored in its memory 26. The software of the portable electronic device 5 is to be executed on or from a portable electronic device 5 with a display 10, the computer software product being arranged to carry out the steps of FIG. 10, namely in step 400 receiving the identity of a vehicle 1, 401 using the identity to retrieve data describing visible features of the vehicle 1. Step 401 is not necessarily carried out if the data describing the visible features are provided together with the ID from the vehicle 1. In step 402 the device 5 displays, on the display 10, the visible features of the vehicle 1. Preferably display 10 is updated at least every 10 seconds, more preferably at least every second, to reflect for example the relative movement of user 4 to surrounding vehicles 1.

In step 403 the device 5 receives input from a user selecting the vehicle, for example through a touch screen. In step 404 the device 5, provides a wireless stop signal to the vehicle 1.

The visible features of a vehicle 1 may be displayed on the display 10 of the device 5 only if the vehicle 1 behaves in a certain predetermined manner, i.e. a potentially dangerous manner. This may be carried out by a danger determination unit 18 in the emergency stop system 2. This may decrease signal traffic in the system 100 and make the display 10 and list 12 less cluttered for the user 4. For example, the visible features may be displayed only if the vehicle 1 has a speed that is over a predetermined threshold or accelerates with an acceleration above a certain acceleration threshold. Erratic steering in combination with high speeds may also trigger display. Again, the emergency stop system 2 may obtain data for determining this from the various subsystems of the vehicle 1.

Danger determination unit 18 may also be located in server 11. In general, parts of emergency stop system 2 may be placed on server 11 as a part of a cloud computing solution.

The server 11 may then use data from subsystems of vehicle 1 and also use vehicle localisation data provided by mobile positioning or GPS, for determining if the vehicle behaves in a dangerous way. For example, if server 11 notices that vehicle 1 drives too fast on a pedestrian street where vehicle traffic is prohibited or only allowed at low speed, the visible features regarding vehicle 1 may be displayed. Control of display 10 can be carried out by emergency stop system 2, server 11 or device 5.

Thus, rules for transmission of ID and display of visible features on display 10 may be employed by the emergency stop system 2, server 11 or the device 5. For example, the list 12 may be edited by server 11 or device 5 based on the behaviour of the vehicle 1. Thus, danger determination unit 18 may be located in server 11, emergency stop system 2 or device 5

Threshold Distance

In order to limit the number of vehicles 1 that are shown on the display 10, the visible features may be displayed on the display 10 of the portable electronic device 5 only if the electronic device 5 is within a threshold distance 17 of the vehicle 1 as seen in FIG. 11. An advantage with this is that a limited number of vehicles 1 is shown on the display 10 of the electronic device 5, making it easier for the user 4 to select the correct vehicle 1. The threshold distance is suitable less at most 100 m, and may be for example 100 m or less, 50 m or less or 30 m or less. Alternatively, the threshold distance 17 may be measured from the portable electronic device 5.

In FIG. 11 the portable electronic device 5a is within the threshold distance 17 and displays vehicle 1 on display 10, but portable electronic device 5b is outside the threshold distance 17 and does not display the visible features of vehicle 1 on the display 10.

Any suitable technology can be used to achieve the threshold distance. The threshold 17 can be achieved by for example the wireless communication unit 9 of the emergency stop system 2 only transmitting the identity signal a short distance. Thus, portable electronic devices 5b that are too far from the vehicle 1 cannot receive the signal, because the signal is too weak. An example is shown in FIG. 6.

Alternatively, the distance between the portable electronic device and the vehicle 1 can be determined by the portable electronic device 5 by measuring the time of flight for the radio wave. In yet another option the vehicle 1 has a phased array, for example on antenna on the front of the vehicle and one in the back of the vehicle. Furthermore, received signal strength indication (RSSI) can be used.

The distance between the vehicle 1 and the portable electronic device 5 can be determined by determining the positions of the portable electronic device 5 and the vehicle 1 and measuring the distance between the positions.

The determination of the position of the vehicle 1 relative to the electronic device 5 may be carried out using any suitable technology. For example, the vehicle 1 may have means for determining the position of the vehicle 1, such as for example GPS, Wi-Fi positioning or mobile positioning (if the vehicle has a mobile cell chip), AGPS or OTDOA. The vehicle 1 may broadcast its position together with the identity, preferably with a predetermined time interval. The position of the portable electronic device 5 can be determined with the use of, for example, mobile positioning or a GPS unit in device 5. The portable mobile device 5, having received the position of the vehicle 1 and being able to determine its own position, can then determine the distance using a map and a distance determination algorithm.

Thus, the vehicle control system 100 can decide to display the visible features only of those vehicles that are within a threshold distance 17 from the portable mobile device 5.

In one embodiment, the server 11 keeps track of the positions of the vehicle 1 and the portable electronic device 5. The server 11 may for example obtain the positions of the vehicle 1 and the portable electronic device 5 from a mobile cell network that uses mobile positioning for each of the vehicle 1 and the portable electronic device 5. The server 11 may also obtain position information for vehicle 1 or device 5 from another unit, for an example a unit in network 19, such as an antenna or a server of a cell phone network. The server 11 may query the network 19, or may obtain positions using push technology. Alternatively, GPS or Wi-Fi positioning may be used. The position of vehicle 1 may be provided to the server 11 together with the ID from the emergency stop system 2. The position of the vehicle 1 may be provided from the server 11 to the portable electronic device 5, which then determines the distance.

The server 11 may provide the identity of the vehicle 1 to the portable electronic device 5 only if the distance between the vehicle 1 and the portable electronic device 5 is within a threshold distance 17. Alternatively, the server 11 may be arranged to receive the identities for a number of vehicles 1 that is within a larger threshold distance 20, for example all the vehicles in a city, and provide updated positions to the portable electronic device 5 at regular time points, and the electronic device 5 compares its own position with the position of the vehicle 1 received from the server 11, and only displays the visible features if the vehicle 1 is within the threshold distance 17. Alternatively, the server 11 only provides to the device 5 the ID for relevant vehicles within distance 17, and the device quires a database on the device 5 for visible features. Thus, the device 5 buffers IDs and visible feature data for a large number of vehicles 1. This may speed up traffic in the system 100. In FIG. 12 device 5*d* is outside threshold distance 20 and has not received any data regarding vehicle 1 from server 11. Device 5*b* and 5*c* are within threshold distance 20 and has received information about vehicle 1 (ID and visible features). However, the devices 5*b* and 5*c* does not display visible features of vehicle 1. 5*a* has received information about vehicle and also displays the visible feature on display 10. If devices 5*b* and 5*c* move so that they are within threshold distance 17, the are able to speedily display the visible features on display 10.

The display 10 is suitable updated frequently, since the set of vehicles 1 that are within the threshold distance will change rapidly with the flow of traffic. A suitable update frequency may be for example, less than 10 seconds, more preferably less than 5 seconds and even more preferably less than 1 second.

The signals between the vehicle 1, the portable electronic device and the server 11 is preferably encrypted. Thus, the emergency stop system 2 and the portable electronic device 5 and server 11 has encryption and decryption units for encrypting and decrypting signals. The signals may also be signed with a digital signature. The method may include the steps of verifying the sender of a signal using a verification unit in the emergency stop system 2, server 11 or the portable electronic device 5.

Since this is an emergency system it is important that communication is carried out fast, so that the stopping signal can be provides as fast as possible. For example, when the stopping signal is provided through a network 19, the stopping signal may be given priority of other types of network traffic.

Furthermore, the portable electronic 5 device may increase its transmission power when the user selects a vehicle on display 10, in order to increase the possibility that the stop signal reaches the vehicle 1. For example, device 5 may increase its transmission power to its maximum transmission power.

Sound

In one embodiment a vehicle 1 can be stopped if a user 4 utters a predefined word or makes a predetermined sound or if a group of users 4 creates a predetermined sound pattern. In this embodiment, emergency stop system 2 has at least one microphone 13 for detecting sounds in the vicinity of the vehicle 1, and a sound analysis unit 14 for detecting and analysing sound. Sound analysis unit 14 comprises at least one predetermined sound pattern. The maximum pickup distance of the microphone may be 20-300 meters. The sound analysis unit 14 is able to analyse sounds picked up by the microphone 13 in real time or near real time. The sound analysis unit 14 may employ artificial intelligence or machine learning and may have noise cancelling capabilities. The microphone 13 may for example be located in a small opening in the body of the vehicle 1. Sound analysis unit 14 may be implemented by hardware or software or both.

The method of FIG. 14 involves the steps: 500 the microphone 13 of the emergency stop system 2 receiving a sound, step 501 the microphone sending a signal representing the sound to the sound analysis unit 14, step 502 the sound analysis unit 14 determining that the received sound matches a predetermined sound pattern. The received sound should at least comprise the sound pattern. In step 503 the sound analysis unit 14 causes the emergency stop system 2 to stop or slow down the vehicle 1.

The sound analysis unit 14 may comprise speech recognition software, able to distinguish spoken words. The predetermined sound pattern can be a predetermined spoken word, for example the word "stop". The emergency stop system 2 may therefore be able to stop or slow down if a user utters the word "stop" in the vicinity of the vehicle 1. The speech recognition software may be able distinguish and understand any language. In a separate embodiment, this may be used to stop a taxi on the street in a non-emergency situation.

The sound analysis unit may be able to interpret the meaning of what is said by users 4, for example if a plurality of persons uses certain combinations of words such as "help", "terrorist", "watch out", or screams or shouts etc. and may be able to detect frustration, fear or anger in the voices. The sound analysis unit 14 may be able to distinguish if these words are uttered by different persons, for example by using sound strength, distance to sound source, if the sounds are overlapping, tone, pitch, talking speed, stress, fear, dialect, language, etc. AI or machine learning may be particularly useful for this. Machine learning may be used to modify or update the predetermined sound pattern.

In one embodiment shown in FIG. 15, the sound analysis unit 14 is capable of identifying a particular sound made by a sound device 15, which is preferably portable, such as for example a whistle. A plurality of sound devices 15 may be distributed among users 4, for example policemen, guards or shopkeepers close to crowded areas. The general public can be informed about the sound made by sound device 15 so that the sound is associated with danger. By using the portable sound device 15 a vehicle stopping signal can be generated quickly. The sound of the sound device 15 also warns people, for example pedestrians, in the vicinity. An advantage of using a sound device 15 is that a loud signal that carries far is generated. The specific sound generated by sound device 15 may also be easier to distinguish from surrounding noise or talk. The sound device 15 can be designed to make a sound that can be distinguished from for example police whistles or other well-known sounds.

Noise pollution is problem in cities and local authorities in general want to obtain information about what levels of noise occur where in a city. When emergency stopping system 2 has a microphone 13 it may be used for mapping of noise pollution. Emergency stopping system 2 then has mapping software 27 for mapping noise. Mapping software 27 uses microphone 13 to regularly record the noise level and store the noise level together with the current position of the vehicle 1. Storage may take place for example at least every 5 minutes, or more preferably every minute or even more preferably at least every 10 seconds. The position of the vehicle 1 is determined as described herein, for example by GPS. The result may be stored in the memory of emergency stopping system 2. Information from a plurality of vehicles 1 collected over time may be combined to form a noise "heat map", that provides important information about the noise levels. The noise information may be transferred from a plurality of vehicles 1 via network 19 to a server, that combines noise information from a plurality of vehicles 1 to obtain the noise map.

Pressing

In one embodiment seen in FIG. 16, the emergency stop system 2 may receive a stop signal from a pressing or touch sensor 16 on the body of the vehicle 1, preferably on the outside of the vehicle. Thus, body of the vehicle 1 may have a button or a part (for example a window) that can be pressed by a user 4 in the case of an emergency to generate an emergency stop signal. Emergency stop buttons connected to the emergency stop system 2 may be placed on the outside of the vehicle 1 such that the can be pressed by users outside the vehicle 1. Also, certain parts of the body of the vehicle 1, for example a door, a side panel or a window may be sensitive to pressing by a user 4 Thus by pressing a button on the vehicle or a part of the body of the vehicle, a user 4 can activate pressing sensitive sensor 16 and send a stopping signal to the emergency stop system 2, causing the vehicle 1 to stop or slow down.

When the vehicle 1 is an autonomous vehicle there may be an emergency stopping button that can be pressed by a passenger, for example to override the autonomous system if it has been hijacked or taken over by a software bug.

Multiple Signals

In order to avoid activation of the stopping activator 3 by mistake or mischief, it may be useful to employ a rule where two independent signals are necessary to activate the stopping activator 3 of the emergency stop system 2. Preferably the independent signals are caused by different users. Preferably at least two stopping signals must be received by the emergency stop system 2 within a predetermined time window in order to activate the stopping activator 3. The stopping signals can be of the same type such as, for example, stopping signals from two different portable electronic devices 5, or may be different types of signals, for example one stopping signal from a portable electronic device 5 and one signal detected by a microphone 13. With reference to FIG. 17, the emergency stopping system 2 may receive signals from wireless communication unit 9 (for example from portable electronic device 5, or server 11 or other device), microphone 13, pressing sensor 16, or other sensors or devices.

With reference to FIGS. 17-20, in step 600 of FIG. 18 the emergency stop system 2 receives a first signal to stop the vehicle 1. The stopping signal may be any of the signals mentioned herein, for example a signal from a portable medical device 5, a sound signal detected by a sound analysis unit 14 or pressing sensor 16, or any other type of signal provided to the emergency stop system 2 by a user that is not driving the vehicle 1. In this embodiment the emergency stop system 2 comprises a timer 21 and counter 22. When the emergency stop system 2 receives the signal, the timer 21 immediately starts, in step 601, a timing procedure to determine if any second signal is received within a predetermined time window. Counter 22 counts the number of signals received during the time window, and may count the first signal as one signal.

The time window may be selected so that it provides adequate safety but still decreased the risk for use by mistake or mischief. The appropriate time window may be selected based on the type of signal (device 5, sound or pressing sensor). The time window may be for example at most 30 minutes, at most 15 minutes, at most 5 minutes, at most 1 minute, at most 10 seconds or at most 1 second. When the system 100 requires signals from at least two different portable devices 5, the time window may be comparatively long, for example at most 30 minutes, at most 15 minutes or at most 5 minutes.

If at least a second stop signal is received within the time window, as in step 602, the emergency stop system causes the vehicle 1 to stop or slow down in step 603. If no second stop signal is received within time window the counter 22 may be set to zero.

In this example two signals are necessary to trigger the stop, but any suitable number of stop signals may be made necessary, for example three, four, five or more signals, or types of signals may be used. It may be required that the signals should be of different types in order to trigger a stop.

For example, the system may be configured to cause the vehicle 1 to stop or slow down only of three signals are received within two minutes, of which two signals are from portable medical devices 5 and one is from pressing sensor 16.

Preferably the plurality of signals are from independent users. The system can be designed in different manners in order to ensure that users are independent.

In one embodiment, shown in FIG. 19, the first signal is provided from a first portable electronic device 5 and the second signal is provided by a second portable electronic device 5'. Again, communication in system 100 can be carried out in any suitable manner, for example via network 19. When there are two stopping signals from different portable electronic devices 5, 5', the portable electronic devices can be identified in system 100 by, for example, a user ID of the portable electronic devices 5, 5'. The user ID is provided to the emergency stop system 2 or server 11 together with the stopping signal. For example, the user ID may be an IMSI or an IMEI of the devices 5, 5'. When the stopping signal is provided with for example Bluetooth, the Bluetooth MAC address can be used for identifying the portable electronic devices 5, 5'. In one embodiment, server 11 receives two signals from two separate portable devices 5, 5' within the time window, and sends one single stopping signal to the emergency stop system 2, which in turn activates stopping activator 3. In this embodiment timer 21 and counter 22 is located in server 11.

Thus, identification of portable electronic devices 5,5' in system 100 can be done by emergency stop system 2 or server 11.

When the stopping signals is a particular spoken word or a pattern of words, a variety of methods can be used.

In one embodiment, speech recognition software is able to distinguish different voices, for example based on tone, speed, etc. If the spoken word is uttered by two different users, as deemed by the speech recognition software, the stopping activator 3 is activated. As discussed above, the sound analysis unit 14 may be able to interpret the meaning of what is said by users, for example if a plurality of persons uses certain combinations of words such as "help", "terrorist", "watch out", or screams or shouts etc. and may be able to detect frustration, fear or anger in the voices. The sound analysis unit 14 may be able to distinguish if these words are uttered by different persons. Sound analysis unit 14 may employ Hidden Markov Models (HMM) for this.

In one embodiment, the vehicle has at least two microphones 13, 13' (FIG. 20). Preferably these are placed far apart on vehicle 1. The plurality of microphones 13, 13' can be used to determine the direction of the source of sound, by using for example triangulation (using at least two microphones). For this purpose, the emergency stop system 2 may have triangulation software 23 which may be employ triangulation. The direction determination software 23 is able to use information from the plurality of microphones 13, 13' to determine the position from where the sound is made. The time difference from when the sound is received by microphones 13, 13' may be used to determine the position.

The intensity of the sound and the amount of distortion of the sound can be used to determine the distance of the user 4. When two different sound sources are far apart within a certain time window, they may be considered to be from two independent users. The time window can for example take into consideration the possible speed of movement of a user, for example a pedestrian walking or running on a street.

When the plurality of signals includes pressing a button on the vehicle 1 or a pressing sensitive part of the body of the vehicle 1 within the time window, it may be necessary to press parts that are spaced apart, for example one pressing sensor 16 on the back of the vehicle 1 and one pressing sensor 16' on the front of the vehicle 1 (FIG. 20) within a short time period, for example 1 second. It is usually difficult for one user 4 to move from the front of the vehicle to the back of the vehicle in 1 second. Thus, this ensures that the two pressing signals are from independent users. Thus, pressing sensors 16, 16' may be separated by a minimal distance. The minimal distance and time window should be selected such that it ensures that signals received from sensors 16, 16' are from independent users. The minimal distance may be 3 meters, more preferably 4 meters, for example.

Moreover, the emergency stop system may take into consideration the movement of the vehicle. If the vehicle 1 moves at 50 km/hour, two pressing actions received 10 seconds apart are most likely from two different users, because the car has travelled 135 meters during that time. The emergency stop system 2 may obtain information regarding this from the abovementioned subsystems of the vehicle 1.

Non-Emergency Embodiments

As mentioned above the embodiment where vehicle 1 has a microphone 12 may be used for non-security purposes, for example hailing a taxi which is an autonomous vehicle, for example by calling out "Taxi!". In these embodiments vehicle 1 has a autonomous control subsystem that controls vehicle as is known in the art. The world "taxi" is recognized by the sound analysis unit 14 which causes the stop activator 3 of stop system 2 to make the taxi slow down and stop (stop system 2 share the features of emergency stop system 2 described above). Preferably the vehicle 1 makes a controlled stop at the curb, so that the user can enter the vehicle.

When a taxi is an autonomous vehicle, it must be able to solve specific issues that are otherwise resolved by a taxi driver. For example, if two different persons call out "taxi" it is reasonable that the person who called out taxi first gets the ride. This may be resolved as follows. As mentioned above and also described below, the sound analysis unit 14 may be able to distinguish between voices of different persons. The passenger door of the vehicle 1 is initially locked until unlocked by stop system 2. The passenger door is locked and prevents a putative passenger from entering the taxi until the door is unlocked. The door is only unlocked if a second spoken word is uttered and detected by system 2, and the system 2 detects that the second spoken word is uttered by the same person who called out "taxi" first, and which caused the vehicle 1 to stop. The user may be prompted to utter a second word, for example by a digital voice or a sign on the door of the vehicle.

With reference to FIG. 21, in step 700 sound analysis unit 14 detects a first spoken word, and saves the voice pattern. The first word is preferably a predefined word, such as, for example, "taxi". In step 701, the system 2 makes the vehicle stop. In step 702 sound analysis unit 14 receives a second spoken word and saves the voice pattern of the second spoken word. The second spoken word may be the same word as the word in step 700 ("taxi", for example), but may also be a different word, for example "open". It may be a predefined word but may also be any word. In step 703 sound analysis unit 14 analyses the voice patterns of the first and second words, and, if they are deemed to be spoken by the same person, the door of the vehicle is unlocked. Thus, if a second person approaches the stopped vehicle and speaks, the voice patterns are not the same and the door will not become unlocked. The door will only unlock if the voice patterns are the same.

The method of FIG. 21 may comprise: detecting the voice pattern of a first spoken word, then making the vehicle stop, then detecting the voice pattern of a second spoken word, then comparing the voice patterns, then unlocking the door.

A second non-security application of the invention is autonomous vending vehicles 1. It is envisaged that, in the future, autonomous vending vehicles 1 will move around cities and sell goods, such as food and drinks. Autonomous vehicle 1 moves around in a predetermined manner as specified by the autonomous control subsystem of vehicle. Vehicle 1 may for example be instructed to drive along a certain street. As with a taxi, a user 4 is able to make such a vehicle 1 stop by calling out a word, for example a word that is written on the vehicle 1. For example, if the user 4 sees an autonomous ice-cream van 1, the user 4 calls out "Ice-cream!" which this makes the vehicle 1 stop, with the use of stopping system 2 as described above. An issue that arises is when the vehicle 1 will start again. This problem is solved by a timer that makes the vehicle 1 start again if user does not interact with the vehicle 1, for example by touching a touch display, making a purchase, etc.

With reference to FIG. 22 a method comprises the steps of 800 microphone 13 and sound analysis unit 14 recognizing a predetermined word, for example "ice cream". This activates stopping activator 3 which makes the vehicle stop in step 801, preferably in a controlled manner, and at the curb side. The vehicle 1 comes to a complete stop. When vehicle 1 has stopped completely, a timer immediately starts in step 802. The stop is detected by the autonomous vehicle subsystem, that starts the timer. If the user 4 does not interact with the vehicle 1 in a predetermined manner within a predetermined time, the vehicle starts moving again in step 803. The starting procedure is defined by autonomous control subsystem. For example, the vehicle may accelerate in a predetermined manner. Interaction between user 4 and vehicle 1 that stops the timer may be detected by a sensor connected to the autonomous control subsystem of the vehicle 1. Basically, the interaction of user 4 with the sensor of vehicle 1 makes the vehicle 1 stay in place so that the user 4 may complete the transaction.

While the invention has been described with reference to specific exemplary embodiments, the description is in general only intended to illustrate the inventive concept and should not be taken as limiting the scope of the invention. The invention is generally defined by the claims.

The invention claimed is:

1. A method to stop or slow down a vehicle in an emergency, said vehicle comprising an emergency stop system, the emergency stop system comprising a first wireless communications unit and a memory, where the emergency stop system is able to cause the vehicle to stop or slow down, and where the emergency stop system has stored in its memory an identity of the vehicle, the method involving a user that is not driving the vehicle, said user carrying a portable electronic device comprising a second wireless communication unit and a display, where data describing visible features is associated with the identity of the vehicle and is stored in at least one of the emergency stop system, a server or the portable electronic device, the method comprising the steps of
   a) the vehicle providing the identity of the vehicle to the portable electronic device with the use of the first wireless communication unit,
   b) the portable electronic device receiving the identity of the vehicle with the use of the second wireless communication unit,
   c) the portable electronic device displaying, on the display, the visible features of the vehicle,
   d) the user selecting the vehicle on the display of the device,
   e) the portable electronic device, using the identity of the vehicle, and the second wireless communication unit, providing a signal to the first wireless communication unit of the emergency stop system of the vehicle,
   f) the first wireless communication unit of the emergency stop system receiving the signal and the emergency stop system causing the vehicle to stop or slow down, where the emergency stop system of the vehicle must receive signals from a plurality of different portable electronic devices within a predetermined time window in order to cause the vehicle to stop or slow down.

2. The method of claim 1 where the visible features of the vehicle is only displayed on the display of the electronic device if the electronic device is within a threshold distance from the vehicle.

3. The method of claim 1 where the identity is provided from the vehicle to a server, and the server provides the identity to the portable electronic device.

4. The method of claim 3 where the identity is provided from the server to the portable electronic device only if the distance between the position of the vehicle and the position of the portable electronic device is below a threshold distance.

5. The method of claim 1 where the visual features is displayed on the display of the portable electronic device only if the vehicle behaves in a certain predetermined manner.

6. The method of claim 5 where the identity is transmitted from the vehicle only if the vehicle behaves in a certain predetermined manner.

7. The method of claim 5 where the predetermined manner is the vehicle moving with a speed above a thresholds speed or accelerates with an acceleration above a threshold acceleration.

8. The method of claim 1 where the visible features of the vehicle are selected from vehicle colour, vehicle manufacturer, vehicle license plate number or license plate letters, or part of license plate numbers or letters, vehicle model, type of vehicle, and nationality, symbol or flag on license plate of the vehicle.

9. The method of claim 1 where the data describing the visible features are transmitted from the vehicle together with the identity.

10. A vehicle control system comprising a vehicle, said vehicle comprising an emergency stop system, the emergency stop system comprising a first wireless communication unit, where the emergency stop system is able to cause the vehicle to stop or slow down, said emergency stop system being configured to wirelessly provide an identity of the vehicle, said identity being linked to data describing visible features of the vehicle, the vehicle control system further comprising an portable electronic device, said electronic device comprising a second wireless communication unit and a display, said electronic device being configured to receive the identity of the vehicle and display the visible features of the vehicle, the electronic device further being configured to, when a user selects the vehicle on the display, sending a signal to the emergency stop system of the vehicle, said signal causing the vehicle to stop or slow down, where the emergency stop system of the vehicle must receive signals from a plurality of different portable electronic devices within a predetermined time window in order to cause the vehicle to stop or slow down.

11. The vehicle control system according to claim 10 where the visible features of the vehicle is displayed on the display of the portable electronic device only if the distance between the vehicle and the portable electronic device is below a threshold distance.

12. An emergency stop system for a vehicle that is controlled by a driver, the emergency stop system being able to cause the vehicle to stop or slow down, said emergency stop system comprising a wireless communication unit where the emergency stop system has stored in its memory an identity of the vehicle, the emergency stop system being configured to wirelessly provide the identity of the vehicle, the emergency stop system further being configured to immediately stop or slow down the vehicle when it receives a plurality of wireless stop signals from a plurality of different portable electronic devices within a predetermined time window.

13. The emergency stop system of claim 12 where the identity is provided repeatedly.

14. A vehicle comprising an emergency stop system according to claim 12.

* * * * *